(12) United States Patent  
Taye et al.

(10) Patent No.: US 7,421,990 B2
(45) Date of Patent: Sep. 9, 2008

(54) HARMONIC DRIVE CAMSHAFT PHASER

(75) Inventors: Elias Taye, Macomb Township, MI (US); Bruno Lequesne, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 11/507,758

(22) Filed: Aug. 22, 2006

(65) Prior Publication Data

US 2008/0047511 A1  Feb. 28, 2008

(51) Int. Cl.
*F01L 1/34* (2006.01)

(52) U.S. Cl. .................. 123/90.17; 123/90.15; 464/160; 74/640; 474/5

(58) Field of Classification Search ............. 123/90.15, 123/90.16, 90.17, 90.18; 464/2, 160; 74/640, 74/665 D, 665 E; 475/1, 5
See application file for complete search history.

(56) References Cited

U.S. PATENT DOCUMENTS

| | | | |
|---|---|---|---|
| 4,770,060 A | 9/1988 | Elrod et al. |
| 4,771,742 A | 9/1988 | Nelson et al. |
| 5,042,380 A | 8/1991 | Quinci |
| 5,058,536 A | 10/1991 | Johnston |
| 5,136,887 A | 8/1992 | Elrod et al. |
| 5,161,429 A | 11/1992 | Elrod et al. |
| 5,253,546 A | 10/1993 | Elrod et al. |
| 5,417,186 A | 5/1995 | Elrod et al. |
| 5,937,710 A | 8/1999 | Gould et al. |
| 6,257,186 B1 | 7/2001 | Heer |
| 6,302,073 B1 | 10/2001 | Heer |
| 6,328,006 B1 | 12/2001 | Heer |
| 6,915,767 B2 | 7/2005 | Pfeiffer et al. |
| 2006/0000435 A1* | 1/2006 | Aust et al. |

FOREIGN PATENT DOCUMENTS

| | | |
|---|---|---|
| DE | 102005025740 | 12/2005 |
| EP | 0440314 | 2/1987 |
| EP | 1813783 | 1/2007 |
| GB | 2354553 | 3/2001 |
| JP | 02067405 | 7/1990 |
| WO | WO 2005/080757 | 9/2005 |

OTHER PUBLICATIONS

Yudong Zhao and Jiqing Lu, A Mechanism With Twin Harmonic Drives for Camshaft Phase Adjustment on DOHC Engines, SAE, San Antonio, Texas, Oct. 14-17, 1996.

* cited by examiner

*Primary Examiner*—Ching Chang
(74) *Attorney, Agent, or Firm*—Michael D. Smith

(57) ABSTRACT

A camshaft phaser comprising first and second harmonic gear drive (HD) units disposed in back-to-back relationship. Each HD includes an elliptical wave generator (WG), a flexspline (FS) deformable by the WG, and a circular spline (CS) for engaging the FS. A dynamic spline (DS) connects the first and second FSs. The first HD is an input HD driven by an engine crankshaft via a sprocket wheel connected to the input CS. The second HD is an output HD driving an engine camshaft. The DS is meshed with both the input FS and the output FS. The phase relationship between the crankshaft and the camshaft may be changed by changing the angular relationship between the first and second WGs. Such change is effected by holding the first WG stationary and varying the angular position of the second WG via an electric motor.

10 Claims, 4 Drawing Sheets

HARMONIC DRIVE CAMSHAFT PHASER

TECHNICAL FIELD

The present invention relates to a mechanism for varying the timing of combustion valves in internal combustion engines; more particularly, to camshaft phasers for varying the phase relationship between an engine's crankshaft and camshaft; and most particularly, to an oil-less camshaft phaser including a pair of harmonic drive units.

BACKGROUND OF THE INVENTION

Camshaft phasers ("cam phasers") for varying the timing of combustion valves in an internal combustion engines are well known. A first element, known generally as a driving member or sprocket element, is driven by a chain, belt, or gearing from an engine's crankshaft. A second element, known generally as a driven member or camshaft plate, may be mounted to the end of an engine's intake camshaft, exhaust camshaft, or both in engines having dual camshafts.

In the prior art, cam phasers typically employ one of two different arrangements for achieving variable valve timing.

In a first arrangement, the sprocket element is provided with a first cylinder having helical splines on its inner surface, and the camshaft element is provided with a second cylinder having helical splines on its outer surface. The first and second cylinders nest together. When one cylinder is driven axially of the other, the helical splines cause relative rotation therebetween, thereby changing the phase relationship. Typically, an axially-acting ram is controllably displaced by pressurized engine oil pirated from the engine oil supply system.

In a second arrangement, the sprocket element is provided with a stator having a central opening and having a plurality of lobes extending radially inward into the central opening and spaced apart angularly of the stator body. The camshaft element is provided with a rotor having hub and a plurality of outwardly extending vanes. When the rotor is installed into the stator, the vanes are disposed between the lobes, thereby defining a plurality of rotor-advancing chambers on first sides of the vanes and a plurality of rotor retarding chambers on the opposite sides of the vanes. Again, pressurized oil is controllably admitted to either the advance chambers or the retard chambers to selectively alter the phase angle between the crankshaft and the camshaft, thereby varying the timing of the engine valves.

While effective and relatively inexpensive, both types of prior art cam phasers suffer from several drawbacks.

First, at low engine speeds engine oil pressure tends to be low, and sometimes unacceptably so; therefore, the response of conventional cam phasers is sluggish at low engine speeds.

Second, at low environmental temperatures, and especially at engine start-up, engine oil displays a relatively high viscosity and is more difficult to pump and to supply to a phaser in a rapid-response fashion.

Third, using engine oil to drive a phaser is parasitic on the engine oil system and can lead to requirement for a larger oil pump.

And finally, for fast actuation, a larger engine oil pump may be necessary, resulting in an additional energy drain on the engine.

What is needed in the art is a camshaft phaser wherein the phaser is not actuated by pressurized oil and therefore phaser performance is not subject to variation in engine oil pressure, temperature, or viscosity.

It is a principal object of the present invention to vary engine valve timing by varying camshaft phase angle without reliance on pressurized oil.

SUMMARY OF THE INVENTION

Briefly described, a camshaft phaser comprises first and second harmonic gear drives (HDs) disposed in back-to-back relationship. As is known in the prior art, and described in greater detail below, each HD includes an elliptical wave generator (WG), a flexible outwardly-splined band (flexspline, FS) surrounding and deformable by the wave generator, and a circular inwardly-splined element (circular spline, CS) for engaging the flexspline. A circular dynamic splined element (dynamic spline, DS) connects the first and second HDs.

The first HD is an input HD driven by an engine's crankshaft via a sprocket wheel connected to the input phase CS. The second HD is an output HD driving the engine's camshaft via an output flange connected to the output phase CS. The DS is meshed with both the input FS and the output FS. The phase relationship between the crankshaft and the camshaft may be changed (thereby changing the timing of valves actuated by the camshaft) by changing the angular relationship between the first and second WGs. Such change is effected by holding the first WG stationary and varying the angular position of the second WG via an electric motor or other rotational actuation means attached to the second WG. A conventional engine control means or module (ECM) may be used to detect, monitor, and control the angular position of the second WG to control phasing of the associated engine valves in conjunction with other ongoing engine functions.

The splines on the FS and the CS define gear teeth, the FS functioning substantially as a sun gear and the CS as a ring gear. The FS teeth are engaged with the CS teeth only along and near the major elliptical axis of the WG. Because the FS has slightly fewer gear teeth than does the CS, the WG counter-rotates by precession with respect to the CS during rotation of either one, defining a gear ratio therebetween identical with the ratio of CS teeth to the numerical difference between FS teeth and CS teeth.

BRIEF DESCRIPTION OF THE DRAWINGS

The present invention will now be described, by way of example, with reference to the accompanying drawings, in which.

The exemplifications set out herein illustrate currently preferred embodiments of the invention. Such exemplifications are not to be construed as limiting the scope of the invention in any manner.

DESCRIPTION OF THE PREFERRED EMBODIMENTS

Figure 1:
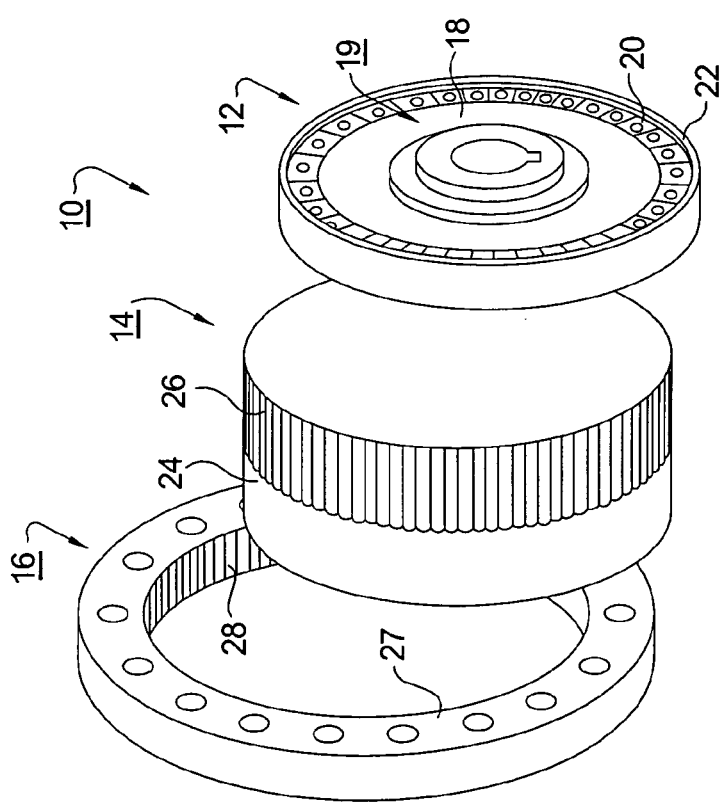
FIG. 1 is an exploded isometric view of a harmonic drive unit, as is known in the prior art.

Referring to FIG. 1, a harmonic gear drive unit 10 comprises a wave generator 12, a flexspline 14, and a circular spline 16.

WG 12 is an assembly of an elliptical steel disc 18 supporting an elliptical bearing 20, the combination defining a wave generator plug 19. A flexible bearing retainer 22 surrounds bearing 20.

FS 14 is a deformable cup-shaped element comprising a thin-walled ring 24 made of alloyed steel, or other alloyed metals such as for example, a titanium alloy, supporting external longitudinal splines (teeth) 26 extending radially outwards. During assembly of the HD unit, WG 12 is inserted axially into FS 14 such that FS 14 is fitted over and becomes elastically deformable by WG 12 to take the same shaped as the elliptical shape of WG plug 19. Thus, rotation of WG plug 19 causes a rotational wave to be generated in FS 14 (actually two waves 180° apart, corresponding to opposite ends of the major ellipse axis of disc 18).

CS 16 is a rigid ring 27 having splines (teeth) 28 formed on the inner surface thereof and extending radially inwards. During assembly of HD unit 10, FS teeth 26 engage CS teeth 28, preferably about 30% of the teeth at all times, along and near the major elliptical axis of WG 12. As noted above, because FS 14 has slightly fewer gear teeth (e.g., 200) than does the CS (e.g., 202), the WG counter-rotates by precession with respect to the CS during rotation of either one, defining a gear ratio therebetween (e.g., 100; that is, 100 rotations of CS 16 correspond to 1 rotation of WG 12). HG unit 10 is thus a high-ratio gear transmission; that is, the angular phase relationship between CS 16 and WG 12 changes by 1% for every revolution of CS 16.

Figure 2:
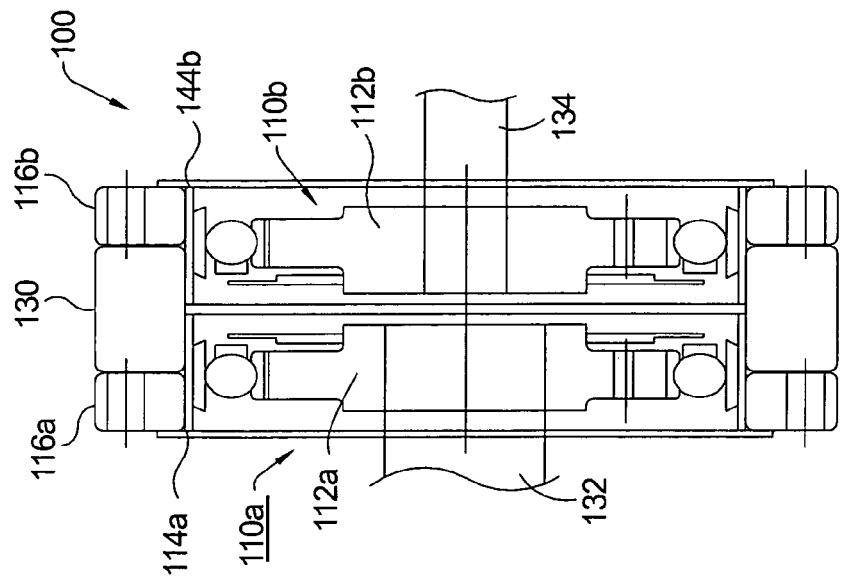
FIG. 2 is an elevational cross-sectional view of a prior art compound harmonic drive assembly comprising first and second harmonic drive units disposed in back-to-back relationship and connected by a dynamic circular spline element.

Referring to FIG. 2, a prior art differential and phasing drive unit 100 defines a compound harmonic gear drive unit substantially as is available as Model HDB from Harmonic Drive LLC, Peabody, Mass. 01960, USA. Unit 100 comprises a first harmonic drive unit 110a and a second harmonic drive unit 110b, each of which includes a WG 112a, 112b, an FS 114a, 114b, and a CS 116a, 116b. Each of FS 114a, 114b extends axially to engage not only its respective CS 116a, 116b but also a common DS 130. It will be seen that the phase relationship between CSs 116a, 116b can be varied by varying the angular relationship between WGs 112a, 112b, for example, by attaching an input shaft 132 to the hub of first WG 112a and an output shaft 134 to the hub of second WG 112b.

Figure 3:
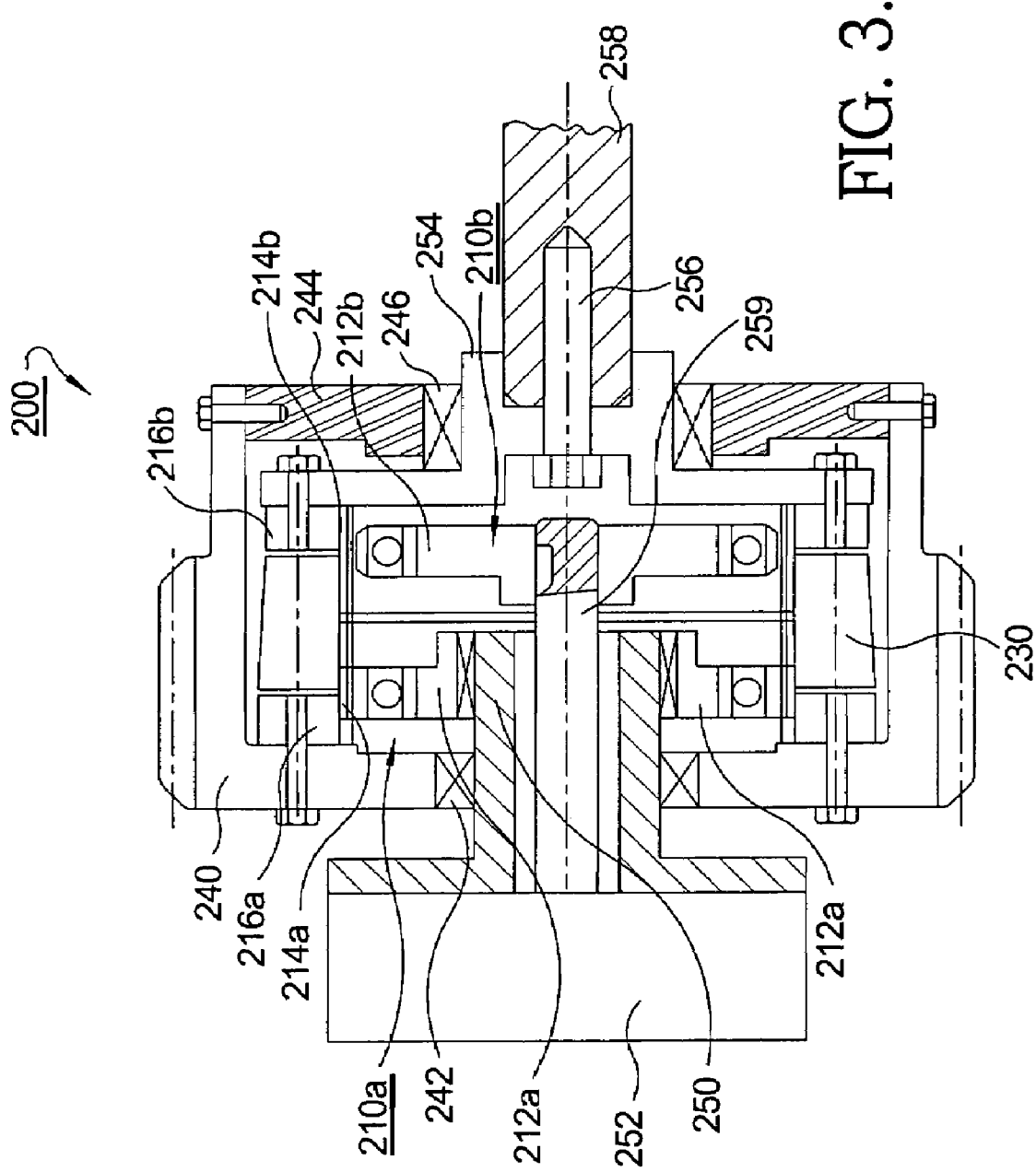
FIG. 3 is an elevational cross-sectional view of a first embodiment of a novel camshaft phaser comprising a compound harmonic drive assembly.

Referring now to FIG. 3, an improved camshaft phaser 200 in accordance with the invention incorporates a differential and phasing drive unit having first and second harmonic gear drive units 210a, 210b constructed substantially as just described for units 110a, 110b but actuated in a novel arrangement to provide phasing of a camshaft with respect to a sprocket input from a crankshaft.

First CS 216a is mounted to a sprocket wheel 240 for driving in time with an engine crankshaft (not shown). Sprocket wheel 240 is supported for rotation by an outer bushing or bearing 242 and, via a sprocket flange 244, an inner bushing or bearing 246. First CS 216a defines an input CS. A first WG 212a and first FS 214a are disposed conventionally within first CS 216a. First WG 212a is mounted on a stationary mount 250 for an electric drive motor 252 as described below. First WG 212a is non-rotational about mount 250.

Second CS 216b is mounted to a flange 254 attachable via bolt 256 to an engine camshaft 258. Second CS 216b defines an output CS. A second WG 212b and second FS 214b are disposed conventionally within second CS 216b. Second WG 212b is mounted on an actuating shaft 259 for rotation thereby, which preferably is an output drive shaft of electric drive motor 252.

Each of FS 214a, 214b extends axially to engage not only its respective CS 216a, 216b but also a common DS 230.

Figure 4:
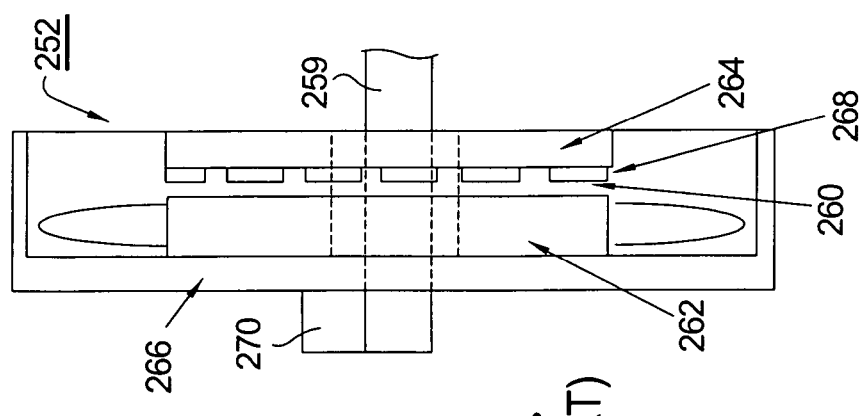
FIG. 4 is a schematic cross-sectional view of a currently preferred axial flux electric motor for use in a camshaft phaser in accordance with the invention.

Referring to FIG. 4, although any style electric motor 252 may be suitable to adjust the phase of the camshaft, an aspect of the present invention includes an axial-flux motor, for compact axial configuration. Of course, other motor types, such as brush motors, switched reluctance motors, etc., could also be used. Most electric motors are generally cylindrical, that is, the air gap between the rotor and the stator is cylindrical. In an axial-flux, permanent-magnet, brushless motor such as is shown schematically in FIG. 4, an air gap 260 is a disc-shaped space between a stator armature 262 and a rotor 264 supporting drive shaft 259, all surrounded by a housing 266. Rotor 264 includes a plurality of permanent magnets 268. Shaft 259 extends from rotor 264. A shaft rotational position sensor 270 sends signals from an encoder (not shown in FIG. 4) to an engine control module (not shown in FIG. 4, but refer to FIG. 6 as described below).

Figure 5:
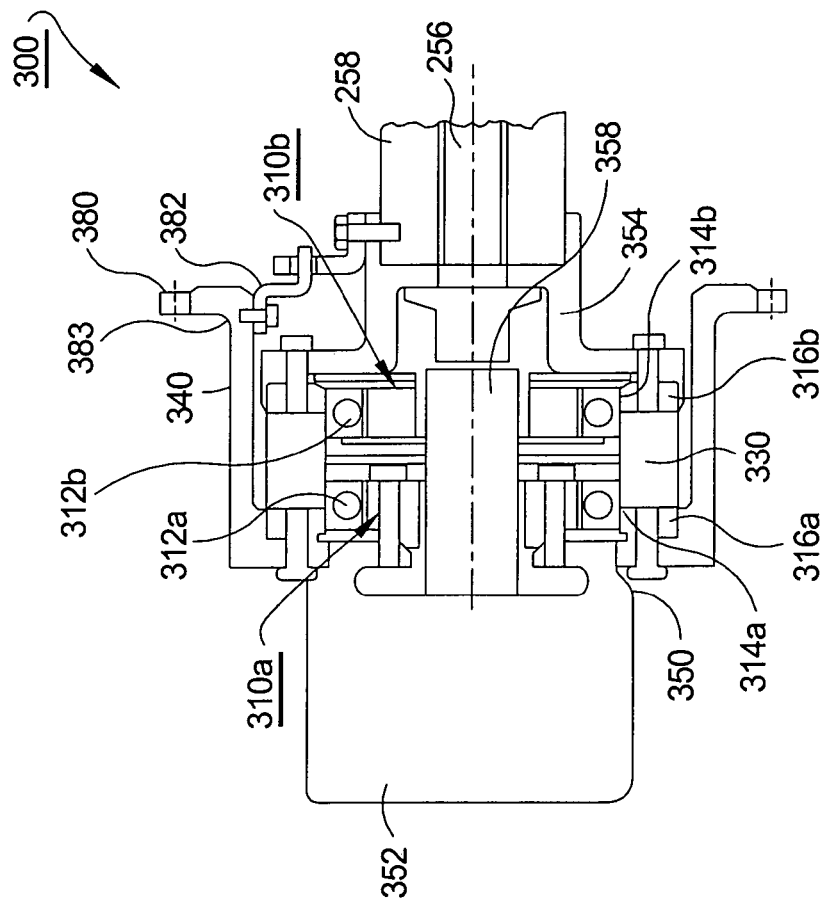
FIG. 5 is an elevational cross-sectional view of a second embodiment of a novel camshaft phaser comprising a compound harmonic drive assembly.

Referring to FIG. 5, a second embodiment 300 of a camshaft phaser in accordance with the invention is similar in construction and identical in operation with first embodiment 200, comprising a sprocket wheel 340 and input and output harmonic gear drive units 310a, 310b. The harmonic gear drive units comprise respective WGs 312a, 312b, input and output FSs 314a, 314b, DS 330, and input and output CSs 316a, 316b, for cooperating with flange 354 and drive motor 352. As in embodiment 200, embodiment 300 is attachable to camshaft 258 via cam bolt 256.

Embodiment 300 includes three significant differences from embodiment 200.

First, input WG 312a is bolted directly to motor mount 350. Sprocket wheel 340 is provided with an enlarged axial opening to permit ingress of motor mount 350. This arrangement simplifies the total assembly and reduces cost by eliminating shaft bearings for input WG 312a which are superfluous because input WG 312a is non-rotational.

Second, sprocket drive gear 380 for sprocket wheel 340 is axially aligned substantially with the face of camshaft 258, which facilitates incorporation of the improved phaser into an existing engine design.

Third, a mechanical phase range limiter 382 (a simple stop) is provided, bolted to camshaft 258 and protruding through an arcuate slot 383 formed in sprocket wheel 340, the two ends of the arcuate slot limiting the movement of limiter 382 at the full phase retard and the full phase advance positions, to prevent engine damage in an interference engine should control systems fail and phasing of the output CS continue unabated beyond the desired phase angle.

Figure 6:
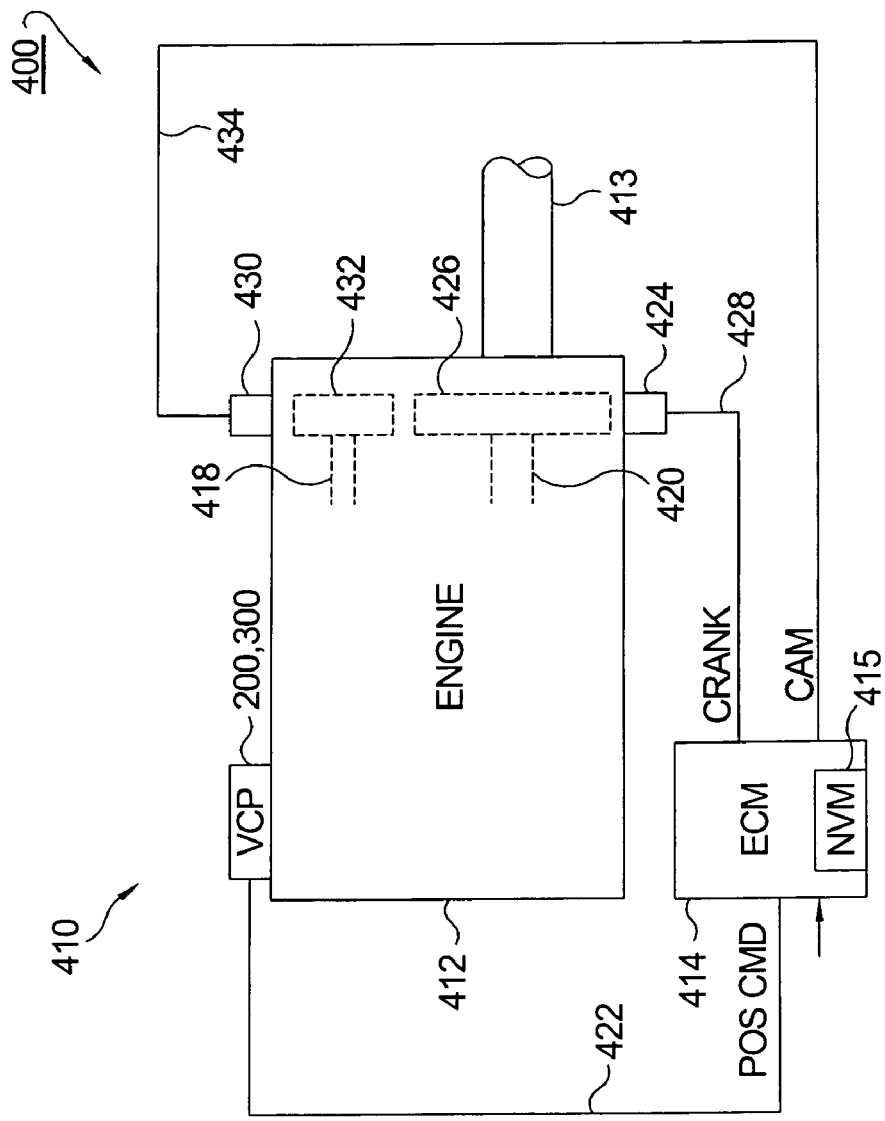
FIG. 6 is a schematic drawing of an exemplary prior art control scheme suitable for control of a camshaft phaser in accordance with the invention.

Referring to FIG. 6, an exemplary control scheme 400 for controlling a camshaft phaser in accordance with the invention is substantially as disclosed in U.S. Pat. No. 6,915,767 B2, issued Jul. 12, 2005 to Pfeiffer et al. The reference numeral 410 generally depicts a motor vehicle powertrain including an internal combustion engine 412 having an output shaft 413 and a microprocessor-based engine control module (ECM) 414. The engine 412 is equipped with a harmonic drive cam phaser (VCP) 200,300 that adjusts the phase of the camshaft 418 relative to the crankshaft 420 in response to a position command signal (POS_CMD) produced by ECM 414 on line 422. A crankshaft position sensor 424 is responsive to the passage of teeth formed on a flywheel 426 attached to crankshaft 420, and produces a CRANK signal on line 428 that includes a pulse corresponding to the passage of each flywheel tooth. Similarly, a camshaft position sensor 430 is responsive to the passage of teeth formed on a wheel 432 attached to camshaft 258 (or alternatively, a motor shaft position sensor 270, as shown in FIG. 4) and produces a CAM signal on line 434 that includes a pulse corresponding to the passage of each tooth of wheel 432.

ECM 414 includes a non-volatile memory (NVM) 415, and carries out a number of control routines for operating engine 412. Most of such control routines are conventional in nature and therefore not addressed herein. In relation to the present invention, for example, ECM 414 executes a conventional control routine for determining a desired position for phaser 200,300 and a closed-loop control (such as a conventional PID control) for adjusting POS_CMD to bring the actual position of phaser 200,300 into correspondence with the desired position. Control scheme 400 is directed to a routine carried out by ECM 414 for reliably determining the actual position of phaser 200,300 based on the pulsed signals CRANK and CAM and a set of stored base offsets. In the illustrated embodiment, ECM 414 also receives an external clock signal CLK, although it will be understood that a similar signal may be generated internally.

In operation of camshaft phaser 200,300, during fixed phasing the input torque coming from crankshaft 420 is applied to sprocket wheel 240,340. Since input circular spline 216a, 316a is rigidly fixed to the sprocket, the input circular spline rotates at the same rotational speed as the sprocket. Since input flexspline 214a, 314a meshes with input circular spline 216a, 316a at two diametrically opposite regions on the major axis of wave generator 212a, 312a, the latter drives the input flexspline via this gearmesh.

Because the input flexspline has fewer teeth (for instance, fewer by two teeth) than the input circular spline, the flexspline advances the tooth difference with each rotation of the input circular spline. This feature creates a corresponding slight increase of speed of the input flexspline over the speed of the input circular spline. Input flexspline 214a, 314a is connected to output flexspline 214b, 314b through dynamic spline 230, 330 which has the same number of teeth as both input flexspline 214a, 314a and output flexspline 214b, 314b. Output flexspline 214b, 314b further transmits the torque/speed to output circular spline 216b, 316b, the latter being attached to camshaft 258 via flange 254, 354. This arrangement creates a slight decrease of rotational speed of output circular spline 216b, 316b from dynamic spline 230, 330, which offsets the effect of the first harmonic gear system and thus outputs a 1:1 gear ratio between the input circular spline 216a, 316a and the output circular spline 216b, 316b. The two wave generators 212a, 312a and 212b, 312b under this condition are both rotationally stationary and the phase relationship between the crankshaft and the camshaft is unchanging.

During phasing of the camshaft with respect to the crankshaft in the advance or retard direction, the driving shaft 258,358, driven by an electric motor 252,352 in the preferred embodiment, rotates output wave generator 212b, 312b in either the advance or retard direction, which correspondingly changes the phase of output circular spline 216b, 316b and thereby adjusts the phase of camshaft 258 via flange 254,354. The phase adjustment, whether in the advance, intermediate (default), or retard position, is controlled by an algorithm of ECM 414. To avoid any backdrive, electric motor 252,352 should be sized to the maximum required torque.

A camshaft phaser in accordance with the invention has the following advantages over a conventional oil driven phaser:

a) the phaser works independently of the engine oil, and thus oil-related issues such as temperature, viscosity, low pressure, and the like are avoided.
b) the harmonic gear drive is a precision gearing system and has very low backlash (<3 arcmin).
c) the phaser is compact and the overall package can be manufactured within a 70 mm×25 mm envelope.
d) high performance requirements such as higher phaser rate (250° CA/sec) and higher authority (100° CA) can be achieved using a phaser in accordance with the invention.
e) the phaser has two wave generators that can be used to control two independent variables (phase angle, speed, etc) if required.

Other design variations, not shown, are also contemplated by this invention. For example, actuating mechanisms other than a motor could be used. An example of such alternative systems is a hysteresis brake to move the phaser in one direction, with camshaft friction torque possibly augmented by a spring moving the phaser in the other direction. Further, a spring, such as for example, a torsional spring, may be added to the cam phaser mechanism to provide a motive force to drive the camshaft to a default position when the phaser is off, or in the event of a phaser malfunction.

Further, while the phaser as shown uses a compound harmonic drive assembly with the sprocket connected as input to one element, the camshaft connected as output to another element, and the actuator connected as controller to a third element, the connections of the various elements of the two harmonic drives to the input sprocket, the output camshaft, the controlling actuator could be permutated in various ways, resulting in design variations all embodying the general principles of the present invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A camshaft phaser for controllably varying the phase relationship between a crankshaft and a camshaft in an internal combustion engine, comprising:
   a first harmonic gear drive unit including a first wave generator, a first flexspline mounted on said first wave generator, and a first circular spline geared to said first flexspline;
   a second harmonic gear drive unit including a second wave generator, a second flexspline mounted on said second wave generator, and a second circular spline geared to said second flexspline; and
   a dynamic spline geared to said first and second flexsplines to couple the actions of said first and second harmonic drive units.

2. A camshaft phaser in accordance with claim 1 wherein said first harmonic drive unit is a crankshaft phase input unit and said second harmonic drive unit is a camshaft phase output unit.

3. A camshaft phaser in accordance with claim 2 further comprising a sprocket wheel fixedly attached to said first circular spline for driving said first circular spline in time with said engine crankshaft.

4. A camshaft phaser in accordance with claim 3 further comprising a flange fixedly attached to said second circular spline and to said engine camshaft for driving said engine camshaft in a phase relationship with said engine crankshaft.

5. A camshaft phaser in accordance with claim 4 further comprising an actuating shaft attached to said second wave generator for changing the orientation of a major elliptical axis of said second wave generator to change the phase of said second circular spline and said camshaft.

6. A camshaft phaser in accordance with claim 5 wherein said actuating shaft is controllably rotatable by a rotational actuator.

7. A camshaft phaser in accordance with claim 6 wherein said rotational actuator includes an electric motor.

8. A camshaft phaser in accordance with claim 7 wherein said electric motor is an axial-flux motor.

9. A camshaft phaser in accordance with claim 7 wherein said first wave generator is fixedly attached to a mount for said electric motor.

10. A camshaft phaser in accordance with claim 1 further comprising a phase rotation limiter rotationally fixed to one of said crankshaft or said camshaft to limit the rotational relationship to the other of said crankshaft or said camshaft.

* * * * *